(12) United States Patent
Lee et al.

(10) Patent No.: US 7,084,095 B2
(45) Date of Patent: Aug. 1, 2006

(54) METHODS FOR CONTROLLING THE RHEOLOGICAL PROPERTIES OF VISCOELASTIC SURFACTANTS BASED FLUIDS

(75) Inventors: Jesse Lee, Sugar Land, TX (US); Erik Nelson, Houston, TX (US); Kevin England, Houston, TX (US); Philip Sullivan, Bellaire, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 375 days.

(21) Appl. No.: 10/325,226

(22) Filed: Dec. 19, 2002

(65) Prior Publication Data

US 2003/0134751 A1 Jul. 17, 2003

Related U.S. Application Data

(63) Continuation-in-part of application No. 09/826,127, filed on Apr. 4, 2001, now Pat. No. 6,881,709, and a continuation-in-part of application No. 10/194,522, filed on Jul. 12, 2002, now Pat. No. 6,908,888.

(51) Int. Cl.
C09K 8/02 (2006.01)

(52) U.S. Cl. ............... 507/261; 507/203; 507/219; 507/221; 507/228; 507/231; 507/240; 507/244; 507/265; 507/267; 507/921

(58) Field of Classification Search ............... 507/203, 507/219, 221, 228, 231, 240, 244, 261, 265, 507/267, 921
See application file for complete search history.

(56) References Cited

U.S. PATENT DOCUMENTS

| | | | | |
|---|---|---|---|---|
| 5,964,295 A | * | 10/1999 | Brown et al. | 166/308.2 |
| 6,194,356 B1 | * | 2/2001 | Jones et al. | 507/225 |
| 6,306,800 B1 | * | 10/2001 | Samuel et al. | 507/129 |
| 6,412,561 B1 | * | 7/2002 | Brown et al. | 166/308.2 |
| 6,433,075 B1 | * | 8/2002 | Davies et al. | 524/815 |
| 6,435,277 B1 | * | 8/2002 | Qu et al. | 166/281 |
| 6,506,710 B1 | * | 1/2003 | Hoey et al. | 507/242 |
| 6,599,863 B1 | * | 7/2003 | Palmer et al. | 507/219 |
| 6,605,570 B1 | * | 8/2003 | Miller et al. | 507/211 |
| 6,613,720 B1 | * | 9/2003 | Feraud et al. | 507/200 |
| 6,767,869 B1 | * | 7/2004 | DiLullo et al. | 507/244 |
| 6,828,280 B1 | * | 12/2004 | England et al. | 507/202 |
| 6,840,318 B1 | * | 1/2005 | Lee et al. | 166/293 |
| 2002/0193257 A1 | | 12/2002 | Lee et al. | 507/200 |
| 2004/0063587 A1 | * | 4/2004 | Horton et al. | 507/100 |

FOREIGN PATENT DOCUMENTS

CA 1109356 9/1981

(Continued)

OTHER PUBLICATIONS

Cement Additives and Mechanisms of Action—Chapter 3 of Well Cementing by Erik B. Nelson-Schlumberger 1990.

(Continued)

Primary Examiner—Philip C. Tucker
(74) Attorney, Agent, or Firm—Thomas O. Mitchell; Tim Curington; Robin Nava (57) ABSTRACT

It was found that the addition of polymers to viscoelastic surfactant base system allows to adjust the rheological properties of the base fluid. Depending in particular on one side of the ratio of the concentration of added polymer and the concentration of viscoelastic surfactant and on the other side of the molecular weight of the added polymer, the same polymer—or the same type of polymer—may perform different functions such as viscosity enhancer, viscosity breaker or viscosity-recovery enhancer.

72 Claims, 5 Drawing Sheets

FOREIGN PATENT DOCUMENTS

| | | |
|---|---|---|
| CA | 1298697 | 4/1992 |
| CA | 2217659 | 10/1997 |
| CA | 2257697 | 12/1998 |
| CA | 2257699 | 12/1998 |
| CA | 2320620 | 3/2001 |
| EP | 0 835 983 | 4/1998 |
| GB | 1388909 | 3/1975 |
| GB | 2332223 | 6/1999 |
| GB | 2332224 | 6/1999 |
| WO | 92/10640 | 6/1992 |
| WO | 92/12328 | 7/1992 |
| WO | 94/09852 | 5/1994 |
| WO | 96/31528 | 10/1996 |
| WO | 98/56497 | 12/1998 |
| WO | 99/24693 | 5/1999 |
| WO | 99/50529 | 10/1999 |
| WO | 99/50530 | 10/1999 |
| WO | 02/084075 | 10/2002 |

OTHER PUBLICATIONS

Aggregation of Alkyltrimethylammonium Surfactants in Aqueous Poly(styrenesulfonate) Solutions. Langmuir 1992, 8, 2405-2412 by Mats Almgren, Per Hansson, Emad Mukhtar, and Jan van Stam.

Study of Surfactant-Polyelectrolyte Interactions. 2.Effect of Multivalent Counterions on the Binding of Dodecyltrimethylammonium Ions by Sodium Dextran Sulfate and Sodium Poly(styrenesulfonate) in Aqueous Solution. J.Phys.Chem. 1983, 87, 506-509 by Katumitu Hayakawa and Jan C.T. Kwak.

M. Samuel et al., "Polymer-Free Fluids for Hydraulic Fracturing", SPE 38622 (1997).

M. M. Samuel et al., "Polymer-Free Fluid for Fracturing Applications," SPE 59478 (1999).

Database WPI, Section Ch, Week 9320, Derwent Publications Ltd., London, GB; AN 93-165551, XP002090141, & SU 1 724 859 A (Oil Ind Operations Des Res Inst), May 23, 1992 *Abstract*.

B. R. Stewart et al., "Use of a Solids-Free Viscous Carrying Fluid in Fracturing Applications: An Economic and Productivity Comparison in Shallow Completions," SPE 30114 (1994).

* cited by examiner

METHODS FOR CONTROLLING THE RHEOLOGICAL PROPERTIES OF VISCOELASTIC SURFACTANTS BASED FLUIDS

This patent application is a continuation-in-part of U.S. application Ser. No. 09/826,127 filed on Apr. 4, 2001 now U.S. Pat. No. 6,881,709, and is a continuation-in-part of U.S. application Ser. No. 10/194,522 filed on Jul. 12, 2002 now U.S. Pat. No. 6,908,888.

TECHNICAL FIELD OF THE INVENTION

This invention relates to compositions and methods used in adjusting the rheological properties of viscoelastic surfactant (VES) fluids, especially for use in treatment of subterranean formations and oil and gas wells.

BACKGROUND OF THE INVENTION

Viscoelastic surfactant fluids are normally made by mixing in appropriate amounts suitable surfactants such as anionic, cationic, nonionic and zwitterionic surfactants in an aqueous medium. The rheology of viscoelastic surfactant fluids, in particular the increase in viscosity of the solution, is attributed to the three dimensional structure formed by the components in the fluids. When the surfactant concentration significantly exceeds a critical level, and eventually subject to the presence of an electrolyte, the surfactant molecules aggregate and form structures such as micelles that can interact to form a network exhibiting viscoelastic behavior. In the remaining part of this description, the term "micelle" will be used as a generic term for organized interacting species.

Viscoelastic surfactant solutions are usually formed by the addition of certain reagents to concentrated solutions of surfactants, frequently consisting of long-chain quaternary ammonium salts such as cetyltrimethylammonium bromide (CTAB). Common reagents that generate viscoelasticity in the surfactant solutions are salts such as ammonium chloride, potassium chloride, sodium salicylate and sodium isocyanate and non-ionic organic molecules such as chloroform. The electrolyte content of surfactant solutions is also an important control on their viscoelastic behavior.

There has been considerable interest in using such viscoelastic surfactants in wellbore-service applications. Reference is made for example to U.S. Pat. Nos. 4,695,389; 4,725,372; 5,551,516, 5,964,295, and 5,979,557.

The rheological properties of aqueous mixtures of surfactants are determined by their tendency to seclude their hydrophobic part, and expose their hydrophilic part, toward the solvent. This behavior typically results in the formation of three-dimensional network structure, called micelles. Depending in particular upon the structure of these micelles, the fluid viscosity is more or less increased, and the fluid may exhibit both viscous and elastic behavior.

The common approach to develop new viscoelastic-surfactant systems is to screen a large number of surfactants—and surfactant mixtures—until one meets specific performance specifications. This approach is obviously time-consuming. Moreover, wellbore services fluids tend to be used under a large variety of conditions, notably temperature, salinity and shear stress. Unfortunately, viscoelastic-surfactants based-fluids are typically very sensitive to variations of the above-mentioned parameters. Therefore the "screening" approach tends to result in numerous systems that are tailored for specific conditions. This presents logistical issues and requires extensive training of field personnel.

Consequently, it would be desirable to have one system whose properties could be adjusted to meet a variety of specifications. For example, consider the possibility of using a particular viscoelastic surfactant system throughout a broad temperature range. It is known that the micelles responsible for the theological properties of viscoelastic surfactant-based fluids are normally stable within a narrow temperature range. Surfactants with longer carbon-atom hydrophobic chains (more than 18 carbon atoms) offer fluid stability at higher temperatures. However, increasing the chain length is also detrimental to the surfactant's hydrophilic properties; therefore, complete dissolution of the surfactant requires considerably more time than that of shorter chain counterparts. There is therefore a need for means to "boost" the viscosity of shorter-chain systems at higher temperatures. It should be further emphasized that some relatively inexpensive viscoelastic surfactants may provide an increase of viscosity that is less than it would be desirable for some applications. Providing means to boost the viscosity would be a way of allowing the use of "less than perfect" product—or to limit the quantity of surfactant to be added to the systems and therefore decreasing the total cost of the system.

Another property of viscoelastic surfactant-based systems is their shear sensitivity. For instance, in the oil industry, it is often favorable to provide fluids that exhibit high viscosity at little or no shear and low viscosity at high shear. Such fluids are easy to pump but will be highly viscous after placement in the well. Though the shear-sensitivity is an intrinsic property of most viscoelastic systems, an independent aspect is the degree of viscosity-recovery or re-healing once the fluid is no more subject to high shear. Controlling the degree of reassembling (re-healing) is necessary to maximize performance of the surfactant system for different applications. For example, in hydraulic fracturing it is critical for the fluid to regain viscosity as quickly as possible after exiting the high-shear region in the tubulars and entering the low-shear enviroment in the hydraulic fracture. On the other hand, it is beneficial in coiled tubing cleanouts to impart a slight delay in regaining full viscosity in order to more efficiently "jet" the solids from the bottom of the wellbore into the annulus. Once in the annulus the regained viscosity will ensure that the solids are effectively transported to the surface. Improving the viscosity-recovery and minimizing the time required for such recovery is therefore desirable.

Finally, it is well known that the introduction of certain components to a viscoelastic surfactant-based system can cause a dramatic decrease in the fluid viscosity, called "breaking". Breaking can also occur by varying the amount of water or electrolyte or other components that may already be present in the fluid. For example, in oilfield applications, the viscosity of viscoelastic surfactant fluids is reduced or lost upon exposure to formation fluids (e.g., crude oil, condensate and/or water). The viscosity reduction effectuates cleanup of the reservoir, fracture, or other treated area.

However, in some circumstances, it would be suitable to have a better control of that breaking, for instance, when breaking of the fluid is desired at a particular time or condition, when it is desired to accelerate viscosity reduction or when the natural influx of reservoir fluids (for example, in dry gas reservoirs) does not break or breaks incompletely the viscoelastic surfactant fluid.

This disclosure describes compositions and methods employed to modify the rheology of aqueous solutions comprising a thickening amount of a viscoelastic surfactant.

UK Patent GB2332223, "Viscoelastic surfactant based gelling composition for wellbore service fluids" by Hughes, Jones and Tustin describes methods to delay and control the build-up of viscosity and gelation of viscoelastic surfactant based gelling compositions. These methods are used to facilitate placement of the delayed ("pre-gel") fluid into a porous medium and then to trigger formation of the viscoelastic gel in-situ.

Rose et. al. describe in U.S. Pat. No. 4,735,731 several methods to reversibly break the viscosity of viscoelastic-surfactant based solutions through an intervention at surface. These methods include heating/cooling the fluid, adjusting the pH or contacting the fluid with an effective amount of a miscible or immiscible hydrocarbon and then, subjecting the fluid to conditions such that the viscosity of the fluid is substantially restored. The reversible treatment of Rose is useful for drilling fluids so that the fluid pumped into the well is viscous enough to carry cuttings to the surface but able to be broken at surface for solids removal. The breaking methods discussed in Rose are not used to break a viscoelastic solution down a well and further appear to have an immediate impact on the viscosity of the fluid.

U.S. patent application Ser. No. 09/826,127 filed Apr. 4, 2001 and published under Ser. No. 20020004464 discloses different types of breaking agents and different means to achieve a delayed release of the breaking agents downhole so that the rheological properties of the aqueous fluids are not altered at surface or during the injection phase. U.S. application Ser. No. 10/194,522 filed Jul. 12, 2002 further discloses that some polymers, in particular some polyelectrolytes, can be used as breaking agents.

However, it was further found that the same types of polymers could also have completely different effects on the rheology of aqueous solutions comprising thickening amount of viscoelastic surfactants. Therefore, there exists a need for methods for breaking/enhancing/healing viscoelastic surfactant fluids after subterranean oil- or gas-well treatments, at predetermined times or conditions.

SUMMARY OF THE INVENTION

The authors of the present invention have found that, at given viscoelastic-surfactant concentration, a polymer can perform different functions (breaker, viscosity enhancer or viscosity recovery enhancer), depending upon its molecular weight and its concentration in the fluid, or more precisely, depending on the ratio of the concentration of added polymer and the concentration of viscoelastic surfactant.

According to a first aspect of the invention, the added polymer has a low molecular weight, typically less than about 25,000. In this case, it was found that the polymer mainly acts as a breaking agent.

According to a second aspect of the invention, the added polymer has a molecular weight higher than about 25,000. In this case, it was found that, at small concentrations (with regard to the amount of viscoelastic surfactant), the polymer promotes a rapid recovery of the viscosity after shear-degradation, and that at higher concentration (typically above 7 wt %), the polymer provides an increase in viscosity of the aqueous fluid.

The methods of the present inventions are focused upon but not limited to rheology-modifiers for viscoelastic surfactant systems based upon cationic surfactants such as erucyl methyl bis(2-hydroxyethyl) ammonium chloride ("EMHAC"); zwitterionic surfactants such as betaine surfactants; and anionic surfactants such as the oleic acid derivatives. However, the methods and compositions described herein are also presented for adjusting the viscosity of viscoelastic surfactant fluids based on anionic, cationic, nonionic and zwitterionic surfactants.

It is one aspect of the invention to provide methods and compositions for the delayed adjustment of the viscosity of the viscoelastic surfactant gelling compositions without significantly or substantially compromising the initial fluid properties required for proppant suspension and transport during a fracturing treatment. The invention thus concerns a method of treating a subterranean formation by injecting down a well an aqueous fluid comprising a thickening amount of a viscoelastic surfactant and also comprising a viscosity-adjuster or a precursor thereof. Optimized formulations ensure that the viscoelastic gel is rapidly formed under surface conditions remains stable during pumping and placement into the fractures. Then, at a later time, the gel viscosity is significantly altered by the added polymer.

The shear sensitivity and hydration of the viscoelastic system fluid can be fine-tuned based on the need for the application. This can be achieved via adjusting the molecular weight distribution of the same polymer or switching to another polymer. The addition of polymer also increases the viscosity of viscoelastic fluid at 100 sec$^{-1}$ shear rate in certain temperature range.

Yet another aspect of the present invention relates to the use of polyelectrolytes and polyethylene glycol, polypropylene glycol, or block copolylmers of polyethylene glycol and polyproylane glycol as breakers of viscoelastic surfactant based solutions. Polyelectrolytes useful in the invention may be anionic, cationic, or zwitterionic. Although it should be understood that any suitable polymer may be used, the following are preferred; sulfonated polynaphthalenes, sulfonated polystyrenes and sulfonated styrene/maleic anhydride polymers. More specifically, polyethylene glycol PEG, polypropylene glycol (PPG), block co-polymers of PEG and PPG, polynphthalene sulfonate and polystyrene sulfonate are preferred. The polymers may be encapsulated.

It should be also understood that the fracturing compositions of the invention may contain components in addition to water, electrolytes, surfactants and breakers. Such additional components are, for example, acids, bases, buffers, chelating agents for the control of multivalent cations, freezing point depressants, etc.

Even if the present application is focused on treatments of hydrocarbon wells, the methods and compositions of the invention can also be employed for other applications, including but not limited to water wells, recovery of coalbed methane, and the containment or remediation of ground or groundwater contamination.

DETAILED DESCRIPTION

EXAMPLE 1

Additions of Polymers to Adjust the Viscosity

In the application of viscoelastic surfactant based gelling compositions comprising viscoelastic surfactants in combination with polymers, drastically different effects may be achieved depending on the molecular weight of the polymer and the weight ratio of added polymers to the viscoelastic surfactant.

Figure 1:
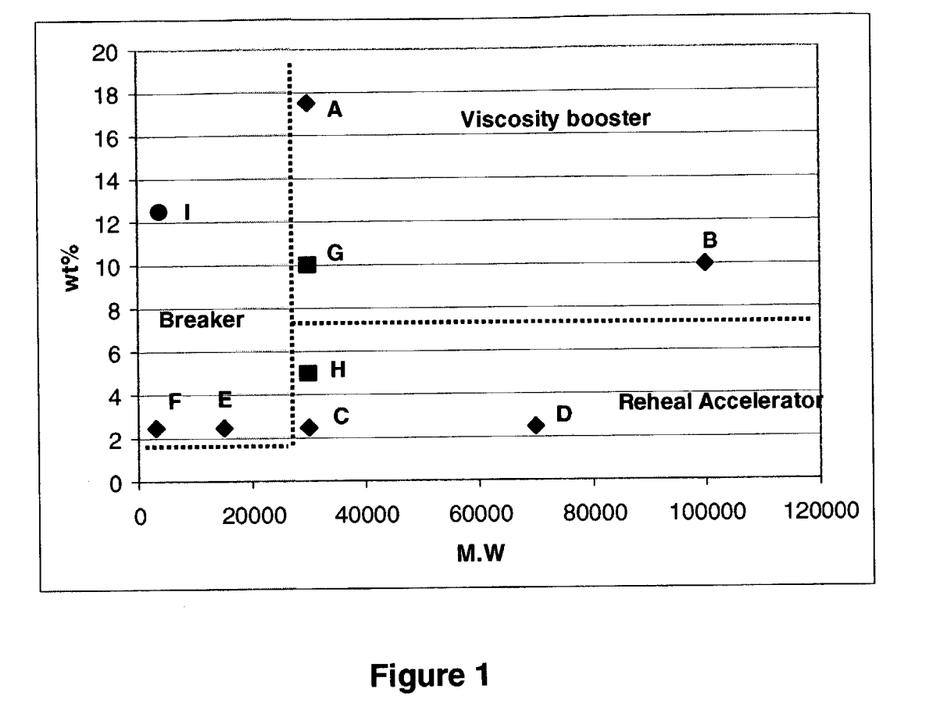
FIG. 1 shows a plot of the polymer molecular weight vs. the weight ratio of polymer to viscoelastic surfactant and the effect of the addition of polymer to the aqueous solution comprising said viscoelastic surfactant.

For examples, to an aqueous solution comprising a surfactant (in test A to F and I a zwitterionic surfactant noted Z1, Erucic amidopropyl dimethyl betaine) and in test G and H, a cationic quaternary amine) is added different type of polymers (PNS: polynaphtalene sulfonate or PSS:polystyrene sulfonate or PPG:polypropyenel glycol), whose molecular weight is listed in table I below. The weight ratio of polymer to the surfactant is noted by Wt %. Table I

TABLE I

| Test # | Surfactant | Polymer | Molecular Weight | Wt % | Effect |
|---|---|---|---|---|---|
| A | Z1 | PNS | 30000 | 17.5 | Booster |
| B | Z1 | PNS | 100000 | 10 | Booster |
| C | Z1 | PNS | 30000 | 2.5 | Healer |
| D | Z1 | PNS | 70000 | 2.5 | Healer |
| E | Z1 | PSS | 15000 | 2.5 | Breaker |
| F | Z1 | PSS | 3000 | 2.5 | Breaker |
| G | C1 | PNS | 30000 | 10 | Booster |
| H | C1 | PNS | 30000 | 5 | Healer |
| I | Z1 | PPG | 4000 | 12.5 | Breaker |

Based on the above data, FIG. 1 was drawn by plotting the different tests using as X-axis the molecular weight of the added polymer and as Y-axis the weight ratio Wt %. This diagram can be divided in three sectors. With polymers of lower molecular weights, the viscosity is broken. With polymers of higher molecular weights, the viscosity of the solution is either enhanced (if the concentration of polymer is high enough) or the additive promotes the recovery of the viscosity after shear-degradation (healer effect).

EXAMPLE 2

Polymer as Breaking Agent

Figure 2:
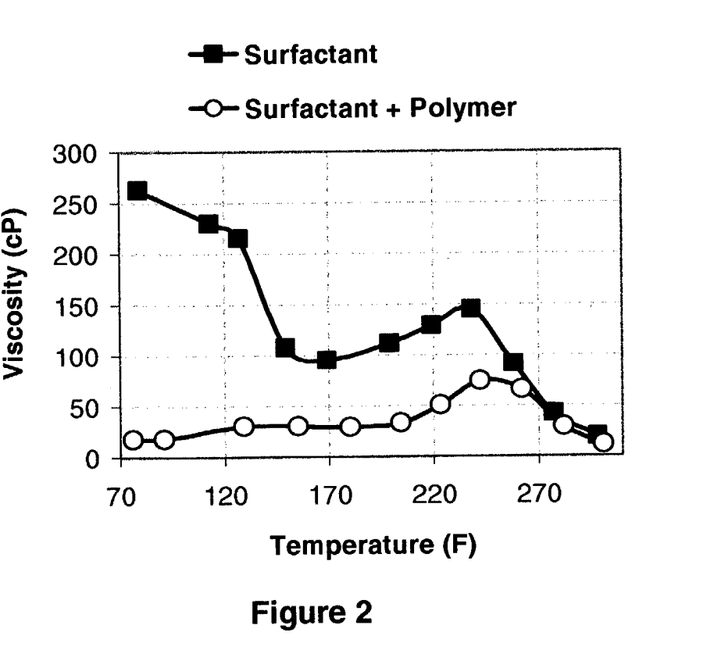
FIG. 2 is a graph showing the effect of a low molecular weight sodium polystyrene sulfonate on a betaine based VES fluid at temperature ranging from 70° F. to 310° F.

A base fluid was prepared by adding to water 2.4 weight percent of erucic amidopropyl dimethyl betaine. 0.06 wt % (weight percent) of polystyrene sulfonate (having a molecular weight estimated between 15000 and 20000) is added to the solution so that the value of Wt % is equal to 2.5%. The fluid viscosities with and without the polymer additive were determined at 100 sec$^{-1}$ from 70° F. to 310° F. and plotted FIG. 2. FIG. 2 shows that a substantial decrease in fluid viscosity is observed when the polystyrene sulfonate breaker is present. This reduction in fluid viscosity is permanent.

EXAMPLE 3

Polymer as Breaking Agent

Figure 3:
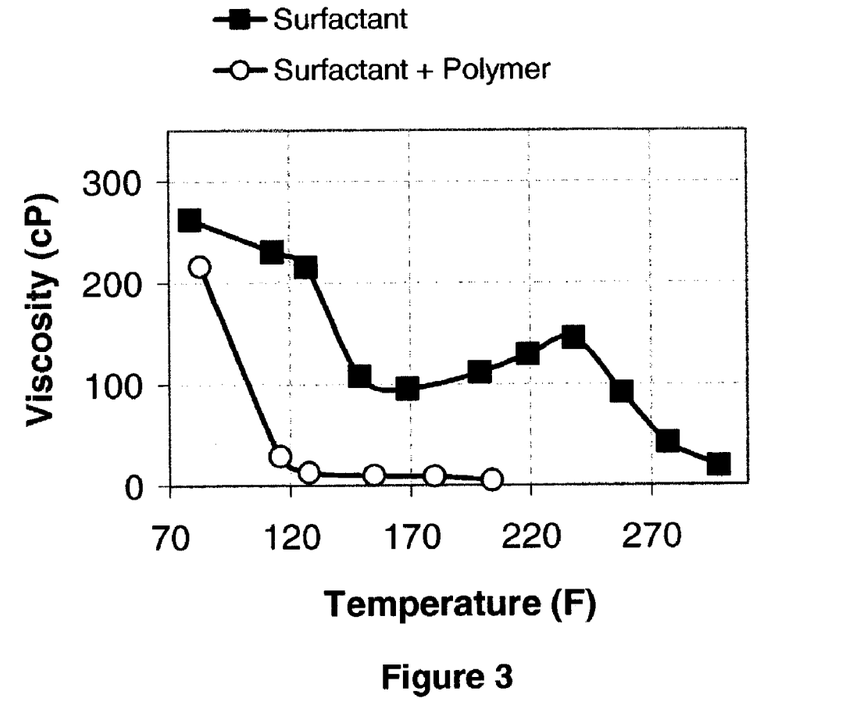
FIG. 3 is a graph showing the effect of a low molecular weight sodium polystyrene sulfonate on a betaine based VES fluid at temperature ranging from 70° F. to 310° F.

A base fluid was prepared by adding to water 2.4 weight percent of erucic amidopropyl dimethyl betaine. 0.06 wt % of polystyrene sulfonate (having a molecular weight estimated between 3000 and 5000) is added to the solution so that the value of Wt % is equal to 2.5%. The fluid viscosities with and without the polymer additive were determined at 100 sec$^{-1}$ from 70° F. to 310° F. and plotted FIG. 2. FIG. 3 shows that a substantial decrease in fluid viscosity is achieved upon adding the polystyrene sulfonate breaker. This reduction in fluid viscosity is permanent.

EXAMPLE 4

Polymer as Viscosity Booster

Figure 4:
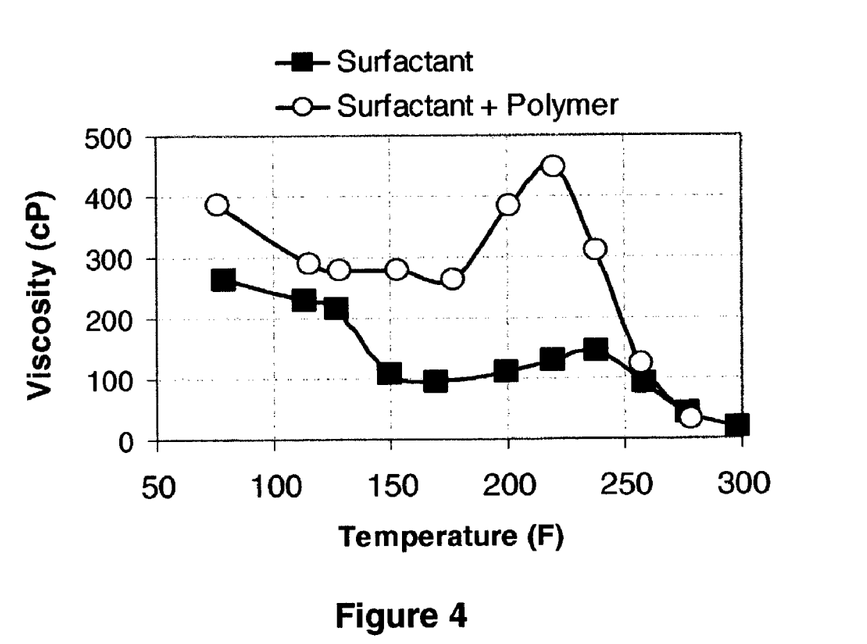
FIG. 4 is a graph showing the effect of a high molecular weight sodium polynaphtalene sulfonate at high concentration on a betaine based VES fluid at temperature ranging from 50° F. to 300° F.

A base fluid was prepared by adding to water 2.4 wt % of erucic amidopropyl dimethyl betaine. 0.42 wt % of polynaphthalene sulfonate (having a molecular weight estimated to be about 30000) is added to the solution so that the value of Wt % is equal to 17.5%. The fluid viscosities with and without the polymer additive were determined at 100 sec$^{-1}$ from 50° F. to 300° F. and plotted FIG. 4. FIG. 4 shows that a substantial increase in fluid viscosity is achieved by adding the polymer, and this increase is especially significant at temperatures between about 200–220° F.

EXAMPLE 5

Polymer as Viscosity Booster

Figure 5:
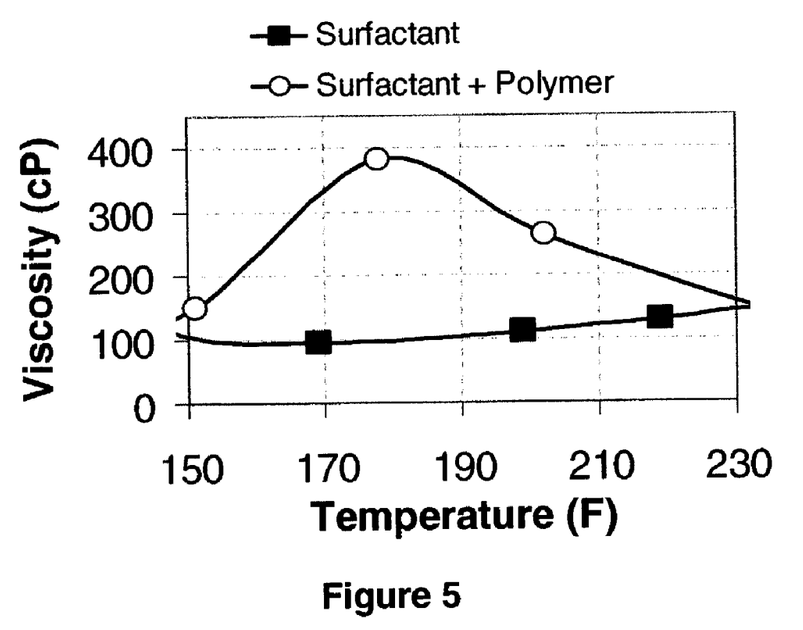
FIG. 5 is a graph showing the effect of a high molecular weight sodium polystyrene sulfonate at high concentration on a betaine based VES fluid at temperature ranging from 150° F. to 230° F.

A base fluid was prepared by adding to water 2.0 wt % of erucic amidopropyl dimethyl betaine. 0.24 wt % % of polystyrene sulfonate (having a molecular weight estimated of about 1,000,000) is added to the solution so that the value of Wt % is equal to 10%. The fluid viscosities with and without the polymer additive were determined at 100 sec$^{-1}$ from 150° F. to 230° F. and plotted FIG. 5. Again, a substantial increase in fluid viscosity is achieved by the addition of the polymer.

EXAMPLE 6

Polymer as Viscosity Booster

Figure 6:
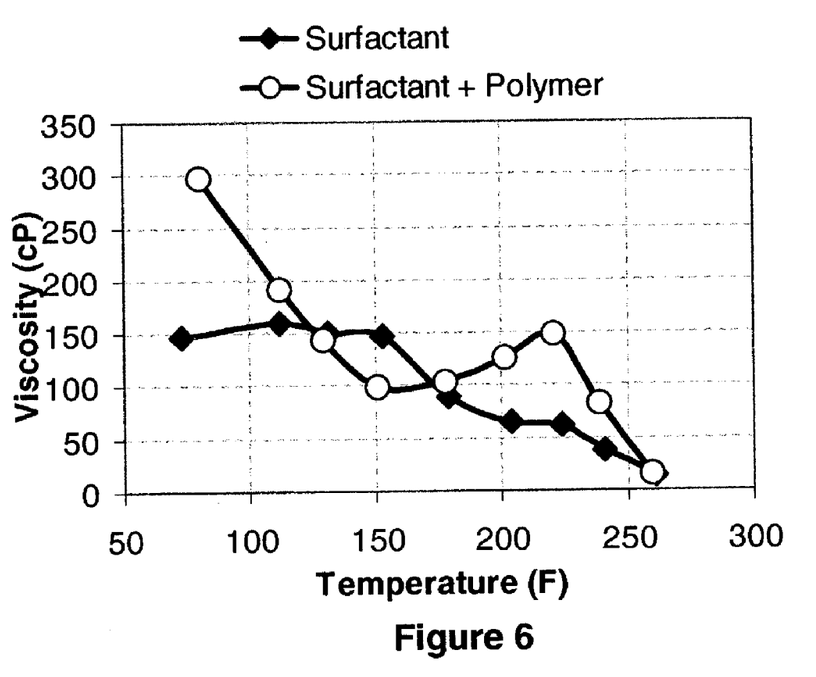
FIG. 6 is a graph showing the effect of a high molecular weight sodium polystyrene sulfonate at high concentration on a cationic quaternary amine based VES fluid at temperature ranging from 50° F. to 250° F.

A base fluid was prepared by adding to water 4 weight percent of cationic quaternary amine and 4% potassium chloride. Polystyrene sulfonate (having a molecular weight of about 30,000) is added at a concentration of 20 lb 1000 gal of base fluid, corresponding to a weight ratio of 10%. The viscosity of the base fluid with/without the polymer additive were determined at 100 sec$^{-1}$ from 50° F. to 260° F. and plotted FIG. 6. A significant increase of the viscosity was observed at the lower and higher temperatures. Some viscosity reduction was observed within the intermediate temperature range.

EXAMPLE 7

Polymer as Healer

Figure 7:
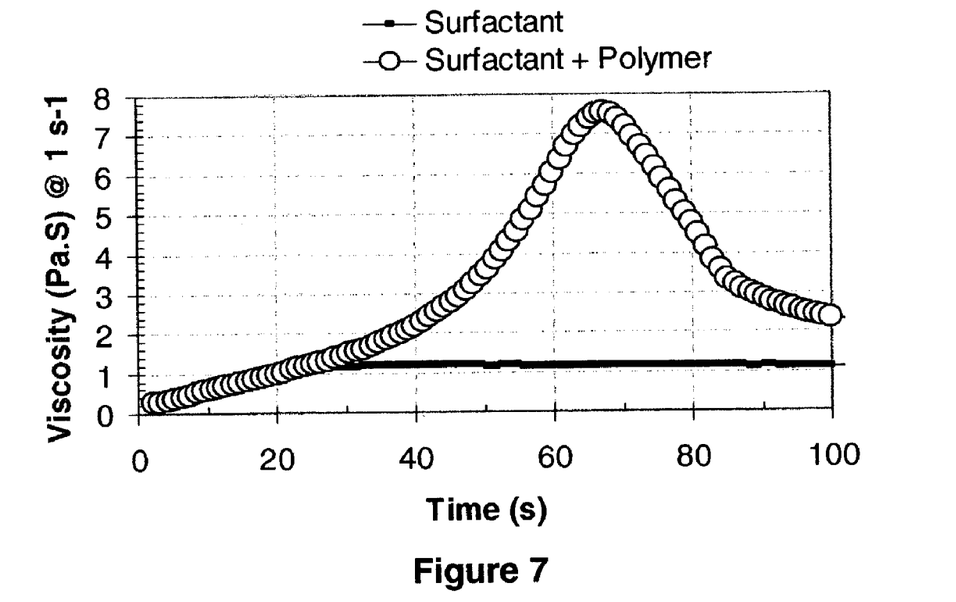
FIG. 7 is a graph showing the effect of a high molecular weight sodium polystyrene sulfonate at low concentration on a cationic quaternary amine based VES fluid after shear degradation of the viscosity.

A base fluid was prepared by adding to water 4 wt % of cationic quaternary amine and 4% potassium chloride. Polystyrene sulfonate (having a molecular weight of about 30,000) is added at a concentration of 10 lb/1000 gal of base fluid, corresponding to a weight ratio of 5%. The fluid is subject to a shear of 5,000 sec$^{-1}$ for 3 minutes. The viscosity of the base fluid with/without the polymer additive was determined at 1 sec$^{-1}$ and 70° F. and is plotted along time FIG. 7. The addition of the polymer provides a quick recovery of the viscosity when the high shear was terminated.

EXAMPLE 8

Polymer as Healer

Figure 8:
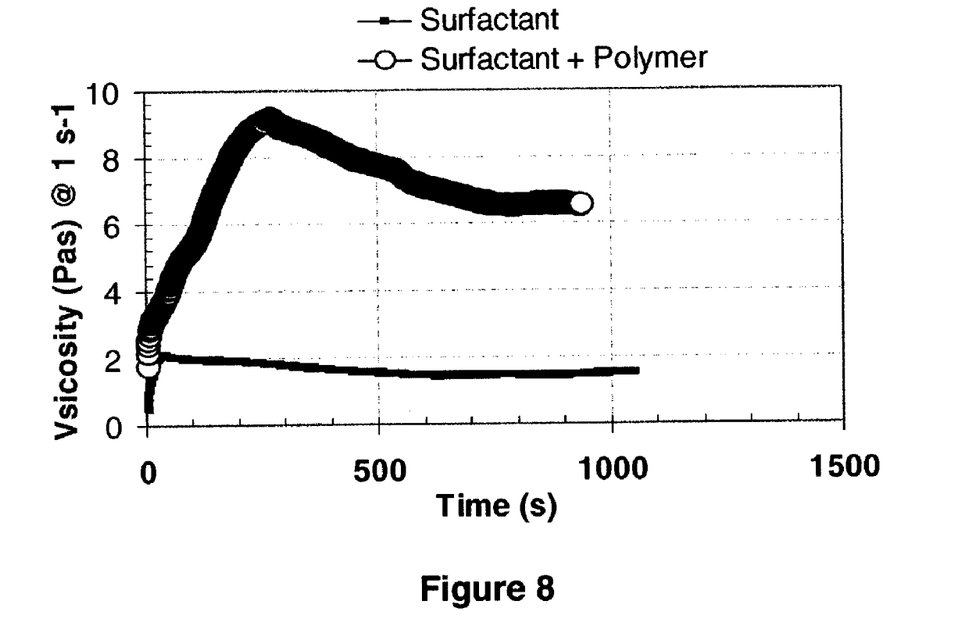
FIG. 8 is a graph showing the effect of a high molecular weight sodium polynaphtalene sulfonate at low concentration on a betaine based VES fluid after shear degradation of the viscosity.

A base fluid was prepared by adding to water 2.0 wt % of erucic amidopropyl dimethyl betaine. 0.06 wt % of polystyrene sulfonate (having a molecular weight estimated to be about 30,000) is added to the solution so that the value of Wt % is equal to 2.5% The fluid is subject to a shear of 5,000 sec$^{-1}$ for 3 minutes. The viscosity of the base fluid with/without the polymer additive were determined at 1 sec$^{-1}$ and 70° F. is plotted along time FIG. 8. The addition of the polymer provides a quick recovery of the viscosity when the high shear was terminated.

EXAMPLE 9

Polymer as Healer

Figure 9:
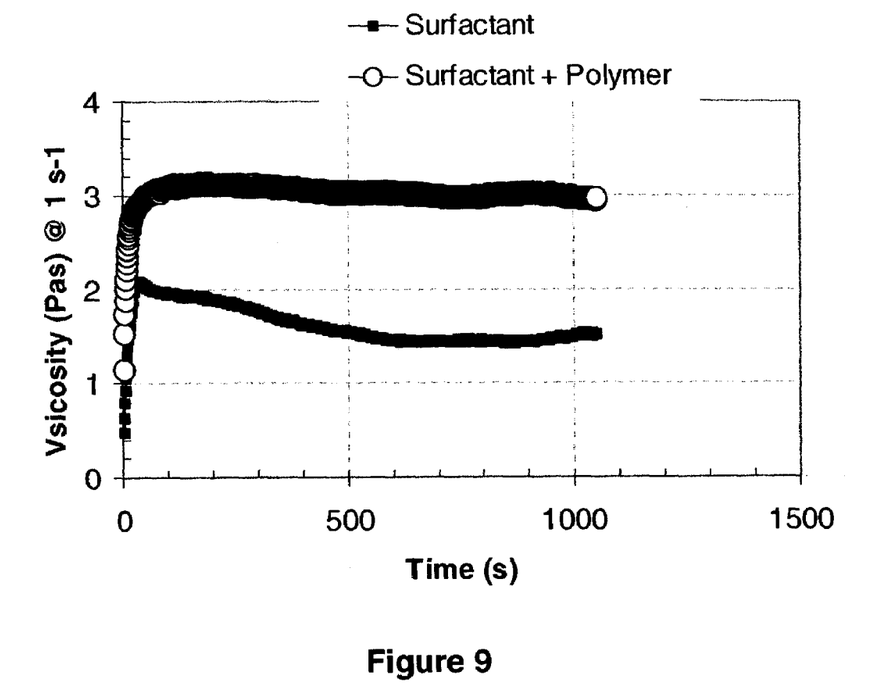
FIG. 9 is a graph showing the effect of a high molecular weight sodium polynaphtalene sulfonate at low concentration on a betaine based VES fluid after shear degradation of the viscosity.

A base fluid was prepared by adding to water 2.4 wt % of erucic amidopropyl dimethyl betaine. 0.06 wt % of polynaphthalene sulfonate (having a molecular weight estimated of about 70,000) is added to the solution so that the value of Wt % is thus equal to 2.5% The fluid is subject to a shear of 5,000 sec$^{-1}$ for 3 minutes. The viscosity of the base fluid with/without the polymer additive were determined at 1 sec$^{-1}$ and 70° F. is plotted along time FIG. 9. The addition of the polymer provides a quick recovery of the viscosity at no shear.

EXAMPLE 10

Polymer as Breaker

Figure 10:
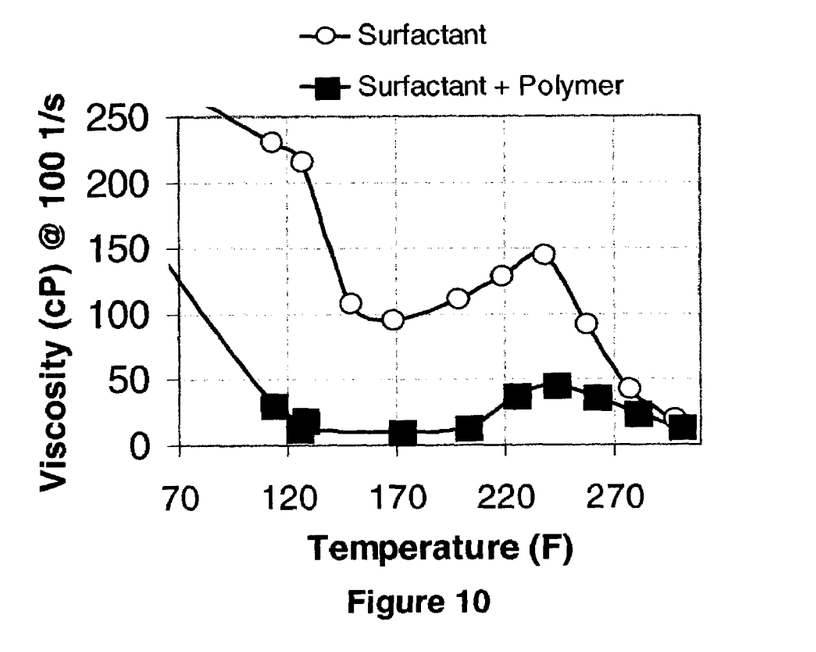
FIG. 10 is a graph showing the effect of a short molecular weight polypropylene glycol on on a betaine based VES fluid at temperature ranging from 70° F. to 310° F.

A base fluid was prepared by adding to water 6 weight percent of erucic amidopropyl dimethyl betaine VES fluid. 0.3 weight percent % of polypropylene glycol (having a molecular weight estimated of about 4,000) is added to the solution so that the value of Wt % is thus equal to 12.5% The viscosity of the base fluid with/without the polymer additive were determined at 100 sec$^{-1}$ and plotted along temperature FIG. 10. The addition of the polymer provides a decrease of viscosity.

The preceding description of specific embodiments of the present invention is not intended to be a complete list of every possible embodiment of the invention. Persons skilled in this field will recognize that modifications can be made to the specific embodiments described here that would be within the scope of the present invention. In particular, though the different embodiments of the present invention were optimised for hydraulic fracturing applications, the invention is also applicable to numerous other oil field applications using surfactant-based complex fluids such as acidizing, gravel packing, coiled tubing cleanup, and other novel chemical treatments.

We claim:

1. A method of treating a subterranean formation comprising the steps of:
    (a) injecting down a well an aqueous fluid comprising a thickening amount of a viscoelastic surfactant;
    (b) providing an encapsulated polymer additive that causes a change in rheology of the fluid under downhole conditions.

2. A method of treating a subterranean formation comprising the steps of:
    (a) injecting down a well an aqueous fluid comprising a thickening amount of a viscoelastic surfactant;
    (b) providing a polymer additive selected from the group consisting of sulfonated polynaphthalenes, sulfonated polystyrenes, sulfonated styrene/maleic anhydride polymers, that causes a change in rheology of the fluid under downhole conditions.

3. The method according to claim 2, wherein said polymer additive is selected from the group consisting of sulfonated polynaphthalenes, sulfonated polystyrenes and sulfonated styrene/maleic anhydride polymers.

4. The method according to claim 1, wherein said polymer additive is selected from the group consisting of sulfonated polynaphthalenes, sulfonated polystyrenes and sulfonated styrene/maleic anhydride polymers.

5. The method according to claim 2, wherein said polymer additive is selected from the group consisting of polynaphthalene sulfonate and polystyrene sulfonate.

6. The method according to claim 1, wherein said polymer additive is selected from the group consisting of polyethylene glycol, polypropylene glycol, block copolymers of polyethylene glycol and polypropylene glycol, polynaphthalene sulfonate and polystyrene sulfonate.

7. The method according to claim 1, wherein said viscoelastic surfactant is selected from the group consisting of anionic surfactant, cationic surfactant and zwitterionic surfactant.

8. The method according to claim 2, wherein said viscoelastic surfactant is selected from the group consisting of anionic surfactant, cationic surfactant and zwitterionic surfactant.

9. The method according to claim 3, wherein said viscoelastic surfactant is selected from the group consisting of anionic surfactant, cationic surfactant and zwitterionic surfactant.

10. The method according to claim 4, wherein said viscoelastic surfactant is selected from the group consisting of anionic surfactant, cationic surfactant and zwitterionic surfactant.

11. The method according to claim 5, wherein said viscoelastic surfactant is selected from the group consisting of anionic surfactant, cationic surfactant and zwitterionic surfactant.

12. The method according to claim 6, wherein said viscoelastic surfactant is selected from the group consisting of anionic surfactant, cationic surfactant and zwitterionic surfactant.

13. The method according to claim 7, wherein said viscoelastic surfactant is selected from the group consisting of erucyl methyl bis(2-hydroxyethyl) ammonium chloride ("EMHAC"), betaine surfactants, and oleic acid derivatives.

14. The method according to claim 8, wherein said viscoelastic surfactant is selected from the group consisting of erucyl methyl bis(2-hydroxyethyl) ammonium chloride ("EMHAC"), betaine surfactants, and oleic acid derivatives.

15. The method according to claim 9, wherein said viscoelastic surfactant is selected from the group consisting of erucyl methyl bis(2-hydroxyethyl) ammonium chloride ("EMHAC"), betaine surfactants, and oleic acid derivatives.

16. The method according to claim 10, wherein said viscoelastic surfactant is selected from the group consisting of erucyl methyl bis(2-hydroxyethyl) ammonium chloride ("EMHAC"), betaine surfactants, and oleic acid derivatives.

17. The method according to claim 11, wherein said viscoelastic surfactant is selected from the group consisting of erucyl methyl bis(2-hydroxyethyl) ammonium chloride ("EMHAC"), betaine surfactants, and oleic acid derivatives.

18. The method according to claim 12, wherein said viscoelastic surfactant is selected from the group consisting of crucyl methyl bis(2-hydroxyethyl) ammonium chloride ("EMHAC"), betaine surfactants, and oleic acid derivative.

19. The method according to claim 1, wherein said polymer additive causes a reduction in viscosity of the fluid, upon contact of the polymer with the aqueous fluid, and has a molecular weight of less than about 25,000.

20. The method according to claim 2, wherein said polymer additive causes a reduction in viscosity of the fluid and has a molecular weight of less than about 25,000.

21. The method according to claim 3, wherein said polymer additive causes a reduction in viscosity of the fluid and has a molecular weight of less than about 25,000.

22. The method according to claim 4, wherein said polymer additive causes a reduction in viscosity of the fluid and has a molecular weight of less than about 25,000.

23. The method according to claim 5, wherein said polymer additive causes a reduction in viscosity of the fluid and has a molecular weight of less than about 25,000.

24. The method according to claim 6, wherein said polymer additive causes a reduction in viscosity of the fluid and has a molecular weight of less than about 25,000.

25. The method according to claim 7, wherein said polymer additive causes a reduction in viscosity of the fluid, upon contact of the polymer with the aqueous fluid, and has a molecular weight of less than about 25,000.

26. The method according to claim 8, wherein said polymer additive causes a reduction in viscosity of the fluid and has a molecular weight of less than about 25,000.

27. The method according to claim 9, wherein said polymer additive causes a reduction in viscosity of the fluid and has a molecular weight of less than about 25,000.

28. The method according to claim 10, wherein said polymer additive causes a reduction in viscosity of the fluid and has a molecular weight of less than about 25,000.

29. The method according to claim 11, wherein said polymer additive causes a reduction in viscosity of the fluid and has a molecular weight of less than about 25,000.

30. The method according to claim 12, wherein said polymer additive causes a reduction in viscosity of the fluid and has a molecular weight of lass than about 25,000.

31. The method according to claim 13, wherein said polymer additive causes a reduction in viscosity of the fluid, upon contact of the polymer with the aqueous fluid, and has a molecular weight of less than about 25,000.

32. The method according to claim 14, wherein said polymer additive causes a reduction in viscosity of the fluid and bus a molecular weight of less than about 25,000.

33. The method according to claim 15, wherein said polymer additive causes a reduction in viscosity of the fluid and has a molecular weight of less than about 25,000.

34. The method according to claim 16, wherein said polymer additive causes a reduction in viscosity of the fluid and has a molecular weight of less than about 25,000.

35. The method according to claim 17, wherein said polymer additive causes a reduction in viscosity of the fluid and has a molecular weight of less than about 25,000.

36. The method according to claim 18, wherein said polymer additive causes a reduction in viscosity of the fluid and has a molecular weight of less than about 25,000.

37. The method according to claim 1, wherein said polymer additive causes an increase in viscosity of the fluid and has a molecular weight greater than about 25,000 and the weight ratio of polymer to the weight of viscoelastic surfactant is above 7%.

38. The method according to claim 2, wherein said polymer additive causes an increase in viscosity of the fluid and has a molecular weight greater than about 25,000 and the weight ratio of polymer to the weight of viscoelastic surfactant is above 7%.

39. The method according to claim 3, wherein said polymer additive causes an increase in viscosity of the fluid and has a molecular weight greater than about 25,000 and the weight ratio of polymer to the weight of viscoelastic surfactant is above 7%.

40. The method according to claim 4, wherein said polymer additive causes an increase in viscosity of the fluid and has a molecular weight greater than about 25,000 and the weight ratio of polymer to the weight of viscoelastic surfactant is above 7%.

41. The method according to claim 5, wherein said polymer additive causes an increase in viscosity of the fluid and has a molecular weight greater than about 25,000 and the weight ratio of polymer to the weight of viscoelastic surfactant is above 7%.

42. The method according to claim 6, wherein said polymer additive causes an increase in viscosity of the fluid and has a molecular weight greater than about 25,000 and the weight ratio of polymer to the weight of viscoelastic surfactant is above 7%.

43. The method according to claim 7, wherein said polymer additive causes an increase in viscosity of the fluid and has a molecular weight greater than about 25,000 and the weight ratio of polymer to the weight of viscoelastic surfactant is above 7%.

44. The method according to claim 8, wherein said polymer additive causes an increase in viscosity of the fluid and has a molecular weight greater than about 25,000 and the weight ratio of polymer to the weight of viscoelastic surfactant is above 7%.

45. The method according to claim 9, wherein said polymer additive causes an increase in viscosity of the fluid and has a molecular weight greater than about 25,000 and the weight ratio of polymer to the weight of viscoelastic surfactant is above 7%.

46. The method according to claim 10, wherein said polymer additive causes an increase in viscosity of the fluid and has a molecular weight greater than about 25,000 and the weight ratio of polymer to the weight of viscoelastic surfactant is above 7%.

47. The method according to claim 11, wherein said polymer additive causes an increase in viscosity of the fluid and has a molecular weight greater than about 25,000 and the weight ratio of polymer to the weight of viscoelastic surfactant is above 7%.

48. The method according to claim 12, wherein said polymer additive causes an increase in viscosity of the fluid and has a molecular weight greater than about 25,000 and the weight ratio of polymer to the weigh: of viscoelastic surfactant is above 7%.

49. The method according to claim 13, wherein said polymer additive causes an increase in viscosity of the fluid and has a molecular weight greater than about 25,000 and the weight ratio of polymer to the weight of viscoelastic surfactant is above 7%.

50. The method according to claim 14, wherein said polymer additive causes an increase in viscosity of the fluid and has a molecular weight greater than about 25,000 and the weight ratio of polymer to the weight of viscoelastic surfactant is above 7%.

51. The method according to claim 15, wherein said polymer additive causes an increase in viscosity of the fluid and baa a molecular weight greater than about 25,000 and the weight ratio of polymer to the weight of viscoelastic surfactant is above 7%.

52. The method according to claim 16, wherein said polymer additive causes an increase in viscosity of the fluid and has a molecular weight greater than about 25,000 and the weight ratio of polymer to the weight of viscoelastic surfactant is above 7%.

53. The method according to claim 17, wherein said polymer additive causes an increase in viscosity of the fluid and has a molecular weight greater than about 25,000 and the weight ratio of polymer to the weight of viscoelastic surfactant is above 7%.

54. The method according to claim 18, wherein said polymer additive causes an increase in viscosity of the fluid and has a molecular weight greater than about 25,000 and the weight ratio of polymer to the weight of viscoelastic surfactant is above 7%.

55. The method according to claim 1, wherein said polymer additive promotes recovery of the viscosity of the fluid after shear degradation and has a molecular weight greater than about 25,000 and the weight ratio of polymer to the weight of viscoelastic surfactant is under 7%.

56. The method according to claim 2, wherein said polymer additive promotes recovery of the viscosity of the fluid after shear degradation and has a molecular weight greater than about 25,000 and the weight ratio of polymer to the weight of viscoelastic surfactant is under 7%.

57. The method according to claim 3, wherein said polymer additive promotes recovery of the viscosity of the fluid after shear degradation and has a molecular weight greater than about 25,000 and the weight ratio of polymer of the weight of viscoelastic surfactant is under 7%.

58. The method according to claim 4, wherein said polymer additive promotes recovery of the viscosity of the fluid after shear degradation and has a molecular weight greater than about 25,000 and the weight ratio of polymer to the weight of viscoelastic surfactant is under 7%.

59. The method according to claim 5, wherein said polymer additive promotes recovery of the viscosity of the fluid after shear degradation and has a molecular weight greater than about 25,000 and the weight ratio of polymer to the weight of viscoelastic surfactant is under 7%.

60. The method according to claim 6, wherein said polymer additive promotes recovery of the viscosity of the fluid after shear degradation and has a molecular weight greater than about 25,000 and the weight ratio of polymer to the weight of viscoelastic surfactant is under 7%.

61. The method according to claim 7, wherein said polymer additive promotes recovery of the viscosity of the fluid after shear degradation and has a molecular weight greater than about 25,000 and the weight ratio of polymer to the weight of viscoelastic surfactant is under 7%.

62. The method according to claim 8, wherein said polymer additive promotes recovery of the viscosity of the fluid after shear degradation and has a molecular weight greater than about 25,000 and the weight ratio of polymer to the weight of viscoelastic surfactant is under 7%.

63. The method according to claim 9, wherein said polymer additive promotes recovery of the viscosity of the fluid after shear degradation and has a molecular weight greater tan about 25,000 and the weight ratio of polymer to the weight of viscoelastic surfactant is under 7%.

64. The method according to claim 10, wherein said polymer additive promotes recovery of the viscosity of the fluid after shear degradation and has a molecular weight greater than about 25,000 and the weight ratio of polymer to the weight of viscoelastic surfactant is under 7%.

65. The method according to claim 11, wherein said polymer additive promotes recovery of the viscosity of the fluid after shear degradation and has a molecular weight greater than about 25,000 and the weight ratio of polymer to the weight of viscoelastic surfactant is under 7%.

66. The method according to claim 12, wherein said polymer additive promotes recovery of the viscosity of the fluid after shear degradation and has a molecular weight greater than about 25,000 and the weight ratio of polymer to the weight of viscoelastic surfactant is under 7%.

67. The method according to claim 13, wherein said polymer additive promotes recovery of the viscosity of the fluid after shear degradation and has a molecular weight greater than about 25,000 and the weight ratio of polymer to the weight of viscoelastic surfactant is under 7%.

68. The method according to claim 14, wherein said polymer additive promotes recovery of the viscosity of the fluid after shear degradation and has a molecular weight greater than about 25,000 and the weight ratio of polymer to the weight of viscoelastic surfactant is under 7%.

69. The method according to claim 15, wherein said polymer additive promotes recovery of the viscosity of the fluid after shear degradation and has a molecular weight greater than about 25,000 and the weight ratio of polymer to the weight of viscoelastic surfactant is under 7%.

70. The method according to claim 16, wherein said polymer additive promotes recovery of the viscosity of the fluid after shear degradation and has a molecular weight greater than about 25,000 and the weight ratio of polymer to the weight of viscoelastic surfactant is under 7%.

71. The method according to claim 17, wherein said polymer additive promotes recovery of the viscosity of the fluid after shear degradation and has a molecular weight greater than about 25,000 and the weight ratio of polymer to the weight of viscoelastic surfactant is under 7%.

72. The method according to claim 18, wherein said polymer additive promotes recovery of the viscosity of the fluid after shear degradation and has a molecular weight greater than about 25,000 and the weight ratio of polymer to the weight of viscoelastic surfactant is under 7%.

* * * * *